(12) United States Patent
Birman et al.

(10) Patent No.: US 9,829,639 B1
(45) Date of Patent: Nov. 28, 2017

(54) SHAPING THE BANDPASS SPECTRUM OF A TUNABLE FILTER FOR OPTICAL NETWORK APPLICATIONS

(71) Applicant: DICON FIBEROPTICS, INC., Richmond, CA (US)

(72) Inventors: Alexander Jacob Birman, Oakland, CA (US); Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 0 days.

(21) Appl. No.: 15/273,394

(22) Filed: Sep. 22, 2016

(51) Int. Cl.
    *G02B 6/293* (2006.01)
(52) U.S. Cl.
    CPC ...... *G02B 6/29389* (2013.01); *G02B 6/29311* (2013.01); *G02B 6/29313* (2013.01); *G02B 6/29395* (2013.01)
(58) Field of Classification Search
    CPC .............. G02B 6/2766; G02B 6/29311; G02B 6/29313; G02B 6/29389; G02B 6/29395
    USPC ........................... 385/24, 27, 31, 37, 39, 140
    See application file for complete search history.

(56) References Cited

U.S. PATENT DOCUMENTS

| 7,899,330 B2 | 3/2011 | Ye et al. | |
|---|---|---|---|
| 2002/0009257 A1* | 1/2002 | Bouevitch | G02B 6/2766 385/24 |

OTHER PUBLICATIONS

Birman et al., "Tunable Optical Filter With Adjustable Bandwidth," U.S. Appl. No. 15/139,694, filed Apr. 27, 2016.
Lehar, "An Intuitive Explanation of Fourier Theory," 2007 [retrieved Oct. 11, 2016], 10 pages, http://sharp.bu.edu/~slehar/fourier/fourier.html.

* cited by examiner

*Primary Examiner* — Akm Enayet Ullah
*Assistant Examiner* — Michael Mooney
(74) *Attorney, Agent, or Firm* — Vierra Magen Marcus LLP

(57) ABSTRACT

A tunable optical filter is described, utilizing a diffraction grating and a rotating mirror. By incorporating a phase screen, or the combination of a phase screen and a transmission amplitude-modulated mask, located in front of the rotating mirror, or possibly at other locations in the optical path, the selected wavelength's passband spectrum can be shaped in a variety of ways. In particular, the output spectrum of the tunable optical filter can be made flatter within the passband, while maintaining good isolation of adjacent channels or wavelengths.

34 Claims, 18 Drawing Sheets

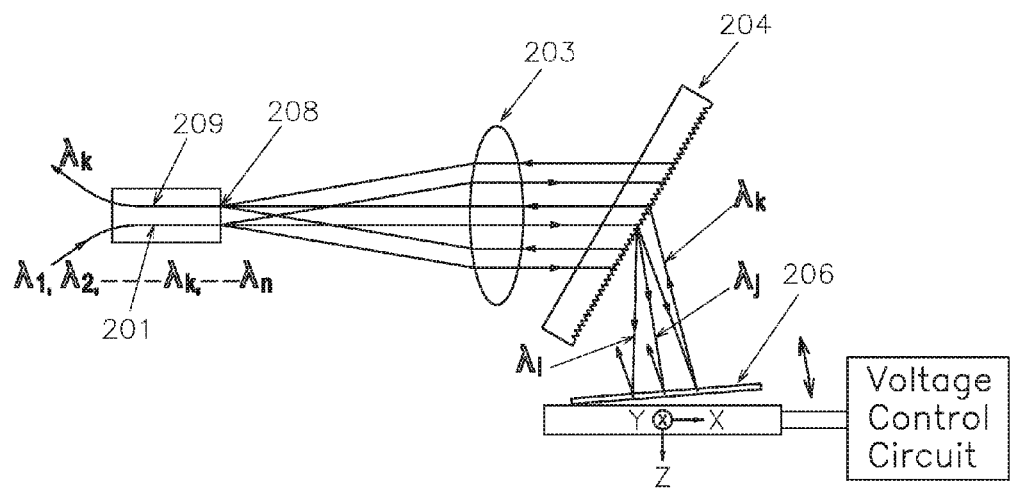
Fig. 2A Prior Art
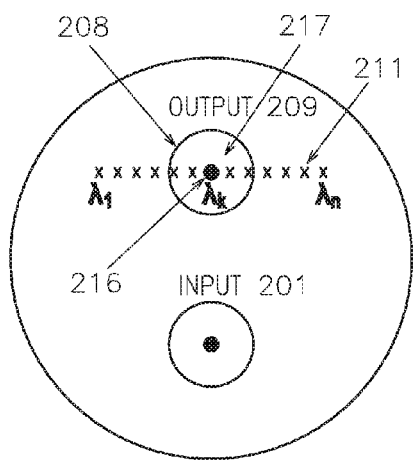 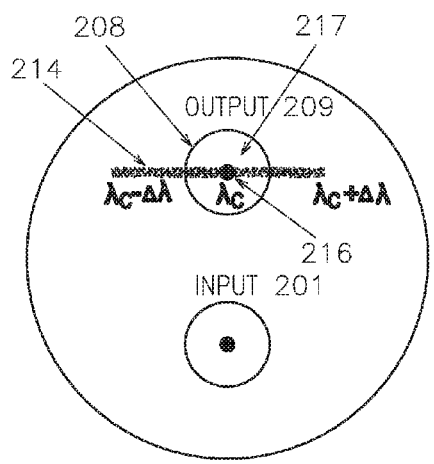
Fig. 2B Prior Art    Fig. 2C Prior Art Phase distribution of the beam reflected from MEMS mirror with double edge phase mask at half focal distance from the mirror for two values of wavelength deviation $\Delta\lambda=0$ and $\Delta\lambda=0.5$nm.

JJ - power density at the entrance of receiving fiber
in case of optimal phase mask width providing flat top MTF
transmittance. JJ0 corresponds to center wavelength position.
JJ1 - 0.5nm wavelength shift, JJ2 - 1.9nm wavelength shift.
J0 - receiving fiber mode power density.

CROSS-SECTION VIEW CUT ALONG X-AXIS

SHAPING THE BANDPASS SPECTRUM OF A TUNABLE FILTER FOR OPTICAL NETWORK APPLICATIONS

BACKGROUND

The following is related generally to optical or fiberoptic components used in optical communication networks and, more specifically, to an optical device that can select a signal from a fiberoptic network that is carrying multiple optical signals, and reshape the wavelength spectrum of the selected signal.

Tunable optical filters are extensively used in modern, reconfigurable fiberoptic networks for a variety of purposes, including the selection of an individual channel or signal, from a fiber that is carrying multiple optical signals. In modern intelligent or re-configurable Wavelength Division Multiplexing (WDM) optical networks, the wavelength of an input optical signal may be changed from time to time. For example, a tunable optical transmitter may be used to generate the input optical signal. Thus, a tunable optical filter is desirable, and may be required to respond to the incoming wavelength change.

Furthermore, the optical signal power for each of the multiple optical signals is modulated to carry the desired information. The higher the modulation rate, the wider the bandwidth of the optical signal or wavelength. Ideally, a tunable optical filter should provide low insertion loss for the selected channel or wavelength, as well as a flat passband characteristic. As new modulation schemes are developed and deployed, it may also be desirable to shape the passband of the tunable optical filter in other ways. The designed width of the passband depends on a number of system or network-level parameters, including spacing of adjacent channels, as well as the modulation scheme and baud rate of the signals. At the same time, the tunable optical filter should provide high attenuation or isolation for channels or wavelengths that are adjacent to the selected channel or wavelength. These objectives are often in conflict with each other.

SUMMARY

A tunable optical filter device includes one or more diffraction elements, a reflector, an actuator, and a phase screen. The one or more diffraction elements are oriented to differentially diffract light of different wavelengths of an incident beam of light incident from an input port. The reflector reflects portions of the beam of light incident upon it by at least one of the one or more diffraction elements in an optical path between the input port and an output port. The actuator is connected to change a position of the reflector so that a selected range of wavelengths of the portion of the beam of light incident upon the reflector is reflected along the optical path from the input port to the output port. The phase screen is in the optical path from the input port to the output port and alters an electrical field distribution of the portion of the beam of light that is incident upon the phase screen.

A method includes receiving a beam of light at an input port and directing the beam of light to be incident on one or more diffraction elements. The one or more diffraction elements differentially diffract different wavelengths of the incident beam of light from the input port. A reflector is positioned so that a first selected range of wavelengths of a portion of the beam of light incident upon the reflector from at least one of the one or more diffraction elements is reflected along an optical path from the input port to an output port. The method also includes altering an electrical field distribution of the portion of the beam of light that is incident on a phase screen positioned in the optical path from the input port to the output port.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIG. 2A illustrates a tunable optical filter, used to select a specific narrow wavelength spectrum from a Wavelength Division Multiplexing (WDM) optical network.

FIG. 2B shows a spectrum of discrete wavelengths, as projected from an input fiber to the end face of an output fiber, via a diffraction grating.

FIG. 2C shows a continuous spectrum emitting from an input fiber, as projected and spread out over the end face of an output fiber, via a diffraction grating.

DETAILED DESCRIPTION

The techniques described in the following provide for the shaping of a bandpass spectrum in a variety of ways, including the provision of a flat passband characteristic, while maintaining a high degree of isolation for adjacent channels or wavelengths. A tunable optical filter, for example utilizing a diffraction grating and a rotating mirror, incorporates a phase screen, or the combination of a phase screen and a transmission amplitude-modulated mask, located in front of the rotating mirror, or possibly at other locations in the optical path. This allows for the selected wavelength's passband spectrum to be shaped in a variety of ways. For example, the output spectrum of the tunable optical filter can be made flatter within the passband, while maintaining good isolation of adjacent channels or wavelengths.

Figure 1:
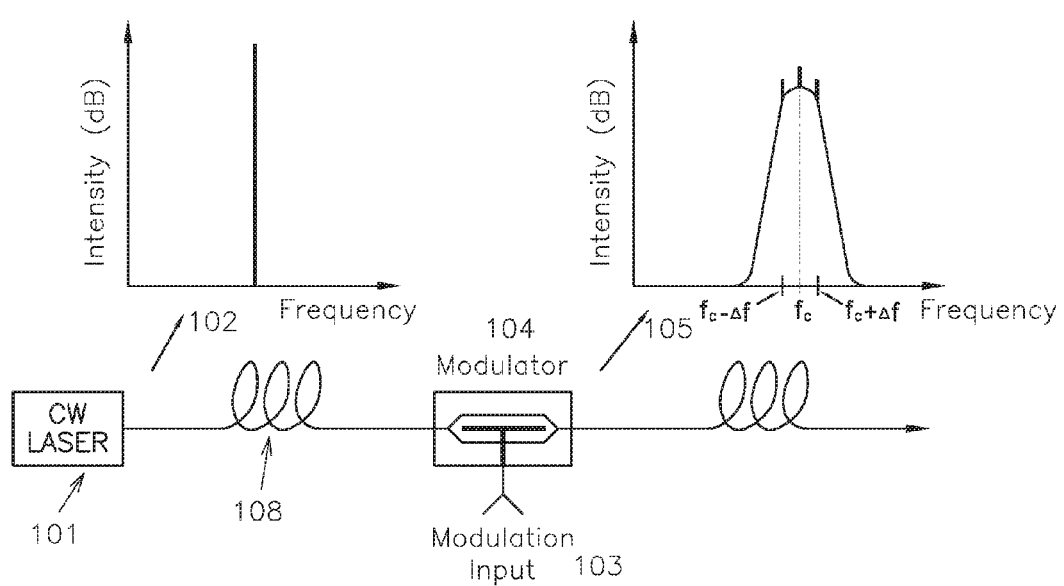
FIG. 1 illustrates a modulated optical signal, as used in optical networks.

FIG. 1 depicts an example of a transmitter as used in typical fiberoptic networks. As shown in FIG. 1, a carrier wavelength from a single-wavelength continuous-wave (CW) laser 101, with an extremely narrow bandwidth as indicated by 102, is coupled to an optical fiber 108. The carrier wavelength is then modulated by the information signal, via the modulation input 103 of a modulator 104, such as a lithium niobate ($LiNbO_3$) Mach-Zender modulator. The wavelength spectrum of the signal coming out of the modulator 104 is therefore broadened, as indicated in spectral diagram 105. Higher modulation rates or information signal bit rates result in a broader spectrum. The shape and bandwidth of the modulated spectrum is also dependent on the modulation format used.

FIG. 2A illustrates an example of a tunable optical filter (for more detail see, for example, U.S. Pat. No. 7,899,330 or U.S. patent application Ser. No. 15/139,694) used to select the narrow wavelength spectrum of a single channel, from a multi-channel Wavelength Division Multiplexing (WDM) optical network. A spectrum of multiple discrete wavelengths (represented here by $\lambda_1, \lambda_2, \ldots, \lambda_k, \ldots, \lambda_n$), or a continuous spectrum, emerges from the fiber end of an input fiber 201 and is collimated by a lens 203 before being angularly dispersed by a diffraction element such as diffraction grating 204, or some other form of wavelength-dispersive element such as a prism, into multiple beams, each carrying their individual wavelengths, in their corresponding directions, lying in the X-Z plane. FIG. 2A shows three of the wavelengths (represented here by three rays, labeled as wavelengths $\lambda_i$, $\lambda_j$ and $\lambda_k$) for simplicity, but all of the wavelengths contained in the input signal are similarly dispersed. These three beams or dispersed wavelengths are reflected by a rotatable mirror 206, which is used to select a wavelength from these three (or more) beams and send it to the output fiber end face 208 (said fiber having a typical core diameter of 9 microns), of the output fiber 209. By rotating the mirror 206 to a specific angular position (via the application of a specific voltage from the voltage control circuit to an actuator connected to the mirror), an individual wavelength from the input wavelength spectrum is coupled to the output fiber 209. In the embodiment shown in FIG. 2A, the beam passes through the diffraction grating 204, or some other form of wavelength-dispersive element, two times. However, in other embodiments, the beam may pass through the wavelength-dispersive element only once, or more than two times. In addition, more than one diffraction grating or wavelength-dispersive element might be used, at different locations in the optical path. For example, either of these situations might exist if the output fiber is separated from the input fiber by a greater distance.

FIG. 2B shows a spectrum of multiple discrete wavelengths, carried by the input fiber 201 in FIG. 2A, as projected onto the end face 208 of the output fiber 209, at different discrete locations indicated by 211. The one light spot $\lambda_k$ that hits the center of the fiber core 216 is coupled to the output fiber 209 with low loss. The rest of the wavelength spots hit the cladding layer 217 (outside the core 216), and are substantially leaked out of the output fiber 209.

Similarly, if the input signal emitting from the input fiber 201 consists of a continuous spectrum, ranging from ($\lambda_c - \Delta\lambda$) to ($\lambda_c + \Delta\lambda$), then this continuous spectrum will be dispersed or spread into a light strip 214 over the end face 208 of the output fiber 209, as shown in FIG. 2C. Only a narrow portion of the overall bandwidth, centered around $\lambda_c$ which hits right on the output fiber core 216, is coupled to the output fiber 209.

Figure 3A:
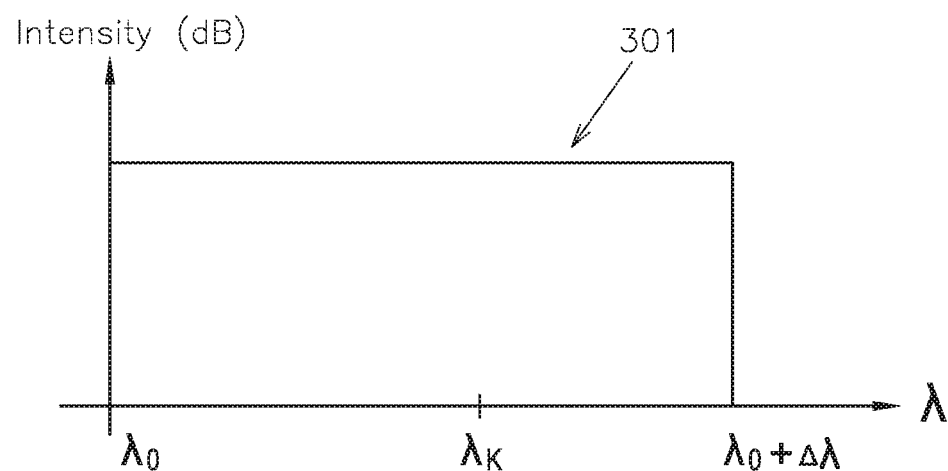
FIG. 3A shows a continuous wavelength spectrum with equal intensity or optical power, over a wavelength range.
Figure 3B:
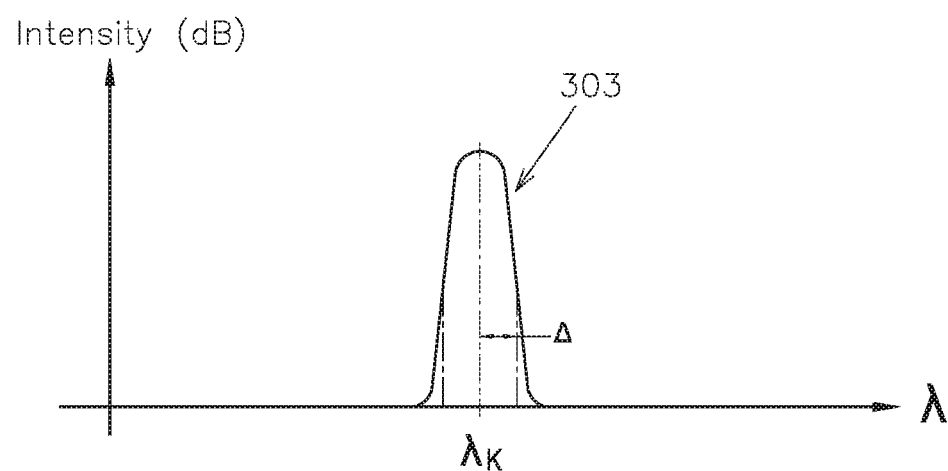
FIG. 3B shows the output spectrum provided by the tunable optical filter shown in FIG. 2A, as it selects a narrow wavelength band from a continuous spectrum and sends it through the output fiber.

If a continuous spectrum with equal intensity or optical power over its wavelength range, as indicated by 301 in FIG. 3A, emerges out of the input fiber 201 of a tunable filter such as illustrated in FIG. 2A, then the spectral power density out of the output fiber 209 is a Gaussian distribution 303 over a narrow bandwidth range, as shown in FIG. 3B. Mathematically, the spectral power distribution coupled to the output fiber 209 can be written as:

$$I(\lambda)=I_0\exp[-(\lambda-\lambda_k)^2/\Delta^2], \quad \text{(equation 1)}$$

where $\Delta$ is one half of the bandwidth.

Figure 4A:
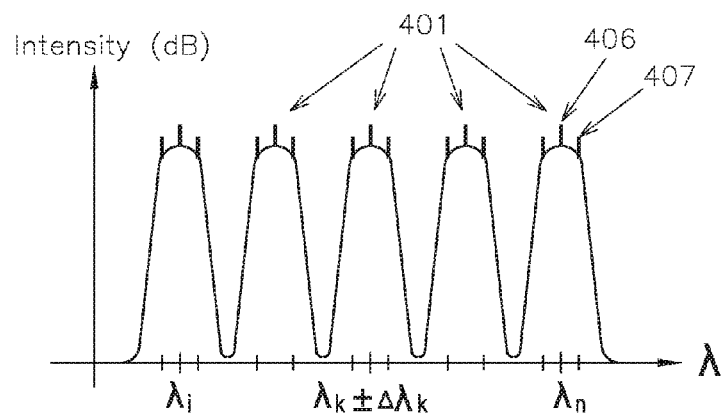
FIG. 4A illustrates the spectrum of an optical fiber that is carrying multiple signals or channels.

FIG. 4A shows multiple input signal channels 401, having carrier wavelengths at $\lambda_1, \ldots, \lambda_k, \ldots, \lambda_n$ respectively, as carried by an optical fiber in an optical network. The spectral shape of each individual channel depends on the modulation bit rate, modulation format, etc., of the transmitter for that channel. The central spike for each channel, as indicated by 406, is the carrier wavelength, and the other spikes, as indicated by 407, are related to the modulation bit rate.

Figure 4B:
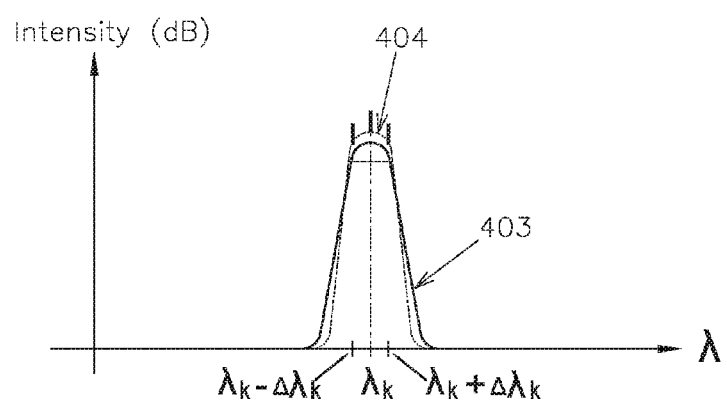
FIG. 4B shows the output spectrum of an optical tunable filter that is used to select a single channel or wavelength band from the multiple channels or bands shown in FIG. 4A.
Figure 4C:
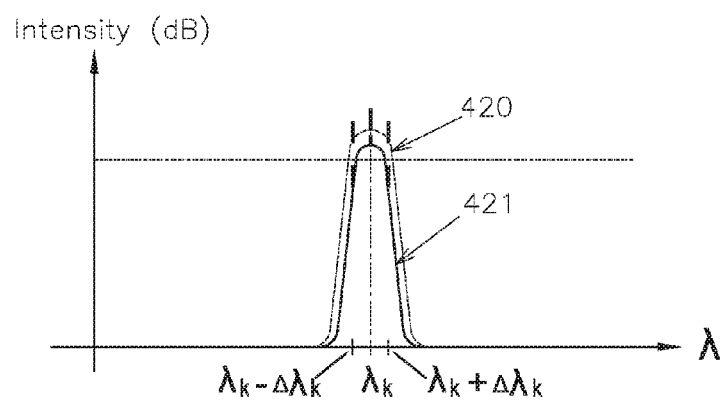
FIG. 4C shows a comparison of the final passband shape of the output of the tunable optical filter, compared to the passband shape of the original signal that was selected.

As shown in FIG. 4B, when a tunable filter having Gaussian bandpass 403 is used to select a channel 404 (represented by $\lambda_k$) from the multiple signal channels shown in FIG. 4A, the passband shape of the tunable filter will attenuate the "outer edges" of the selected input signal (i.e., the wavelengths of the selected input signal that are farther away from the central carrier wavelength $\lambda_k$). Thus, the spectrum of the selected signal channel is distorted after passing the tunable filter. More specifically, the Gaussian bandpass characteristic of a typical prior art tunable optical filter that uses a dispersive element such as a grating or prism, results in some loss of information. In practical terms, this manifests itself in either a reduced signal-to-noise ratio, or else some sort of restriction on either the modulation bit rate or the maximum distance between network nodes. As shown in FIG. 4C, the spectral shape 421 of the output signal of a prior art tunable optical filter may be significantly deviated from the original spectral shape of input signal channel 420.

It is therefore desirable in many applications to have a tunable optical filter whose passband characteristic has no bias to any wavelength component within the signal spectrum. Consequently, in these cases transmittance within the passband is preferably as flat as possible (or constant within the passband). At the same time, the attenuation or isolation of adjacent signal channels should be maintained. The exemplary embodiments presented here add a phase screen, or the combination of a phase screen as well as a transmission amplitude-modulated mask, to the optical path of a tunable optical filter, as illustrated in FIGS. 5A to 9C.

It should be noted that in some cases it may be desirable for the passband of the tunable filter to have a different shape that is intentionally designed to be "non-flat". As new modulation schemes are developed or deployed, other filter passband shapes may be desired. Also, in some applications, it may be beneficial to overall system performance to have a filter passband shape or characteristic that compensates for filtering of the optical signal by other components in the overall signal path. As just one example, a filter passband that emphasizes the edges of the passband, with relatively greater attenuation at the center of the passband, might offer significant benefits in some applications and network configurations. The techniques presented here can be applied to tunable optical filters with shaped passbands of different shapes, with a variety of spectral characteristics.

Figure 5A:
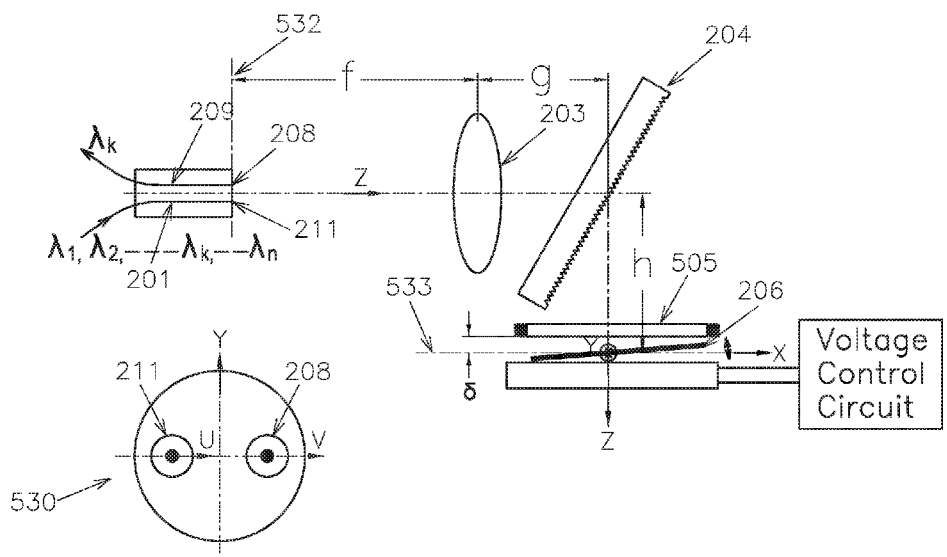
FIG. 5A illustrates one embodiment in which a phase screen, or the combination of a phase screen and a transmission amplitude-modulated mask, is placed directly in front of the reflective mirror of a tunable optical filter, in order to alter the spectral shape of the passband.

FIG. 5A illustrates one embodiment, showing a tunable filter with a phase screen 505, that may also be combined with a transmission amplitude-modulated mask (not shown). The phase screen (and optional transmission amplitude-modulated mask) are inserted into the optical path, for example directly in front of the rotatable mirror 206 of the tunable filter structure that was illustrated in FIG. 2A. In an exemplary set of embodiments, the phase screen is shown as a separate element or plate, with a separation $\delta$ between the phase screen and rotatable mirror 206 that is made as small as practical. Alternatively, the phase screen may be attached to the rotatable mirror 206, or it may be deposited directly onto the rotatable mirror 206 as a coating. It is should be noted that in the illustrated embodiment, the end faces 211 and 208 of both the input and output fibers are located at the front focal plane 532 of the lens 203, and the optical path length between the lens and the mirror 206 (denoted by g plus h) is substantially equal to the focal length f of the lens 203. When the fiber end faces 211 and 208 and the rotatable mirror 206 are located in the front focal plane 532 and the rear focal plane 533, respectively, it is well known from the principles of Fourier Optics (see "An Intuitive Explanation of Fourier Theory" by Steven Lehar, available at http://cns-alumni.bu.edu/~slehar/fourier/fourier.html, for example) that the respective electric field amplitude distributions at the front focal plane 532 and at the rear focal plane 533 have an exact Fourier transform relationship. For simplicity, let lateral coordinate u denote a line (see inset drawing 530 in FIG. 5A) across the input fiber end face 211, which lies in the front focal plane, and is treated as the objective plane. Similarly lateral coordinate x denotes a line across the mirror 206, which lies in the rear focal plane 533, and is treated as the image plane. Then the relationship between two field amplitude distributions is:

$$E(x)=(ik/2\pi f)^{1/2}\int\exp(ik\cdot u\cdot x/f)\cdot e(u)du, \quad \text{(equation 2)}$$

where $E(x)$ and $e(u)$ are the electric field amplitude distributions across the rotatable mirror 206 and across the end face 211 of the input fiber 201, respectively, f is the focal length of the lens 203, and k is the wave number of a specific wavelength.

The embodiment shown in FIG. 5A has input fiber 201 and output fiber 209 located close to each other, in the same fiber ferrule. This embodiment utilizes a single lens 203, and the beam passes the diffraction grating two times, as in the embodiment of FIG. 2A, although other configurations or embodiments are possible. The input fiber and output fiber may be physically separated by a greater distance, and may be held or located within separate fiber ferrules. There may be separate lenses for the beam from the input fiber, and the beam that is directed to the output fiber. Finally, the beam(s) may pass the wavelength-dispersive element once, twice, or more than two times, and in some configurations more than one wavelength-dispersive element may be used.

The electric field mode of a single mode fiber $e(u)$ is usually described by a Gaussian function:

$$e(u)=e_0\exp[-(u-u_0)^2/w_0^2], \quad \text{(equation 3)}$$

where $e_0$ is the normalization constant, $u_0$ is the lateral position of the center of the core of the input fiber end face 211 in the front focal plane 532, and $w_0$ is the mode field radius.

Figure 5B:
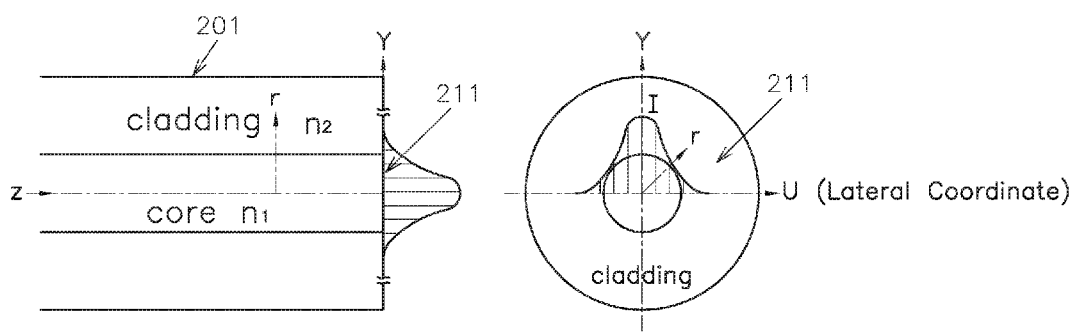
FIG. 5B shows a Gaussian power distribution profile, as emitted from the end face of an optical fiber.
Figure 5C:
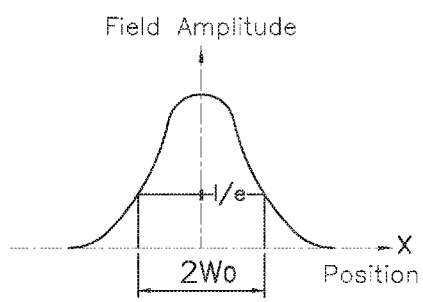
FIG. 5C plots the electric field distribution of a Gaussian beam as a function of position, as a means of defining the beam size.

FIG. 5B shows the optical power distribution 211 of a Gaussian beam emitting out of the fiber end face 211 of the input fiber 201. FIG. 5C plots the electric field distribution of a Gaussian beam as a function of position, or radial distance from the center of the beam, and is used to define the mode field radius $w_0$. From equation 2, it can be seen that $E(x)$ is also a Gaussian distribution, because $e(u)$ is a Gaussian distribution.

When a beam of a specific wavelength is incident on the mirror 206, it will typically be with a small angle, as a result of the beam being tilted by the diffraction grating 204 or some other form of dispersive element. Then the equation 2 should be modified to address the non-normal incident beam and its wavelength-dependent incident angle as follows:

$$E(x)=(ik/2\pi f)^{1/2}\int \exp(ik \cdot u \cdot x/f) \cdot \exp(-ik \cdot \alpha \cdot \Delta\lambda \cdot x) \cdot e(u)du, \quad \text{(equation 4)}$$

where α is the grating's (or other dispersive element's) angular dispersion coefficient, f is the focal length of the lens, and Δλ is the wavelength deviation from the central value $\lambda_c$.

In FIG. 5A, a phase screen 505 is located directly in front of the mirror 206. Suppose that the single-pass transmission through the phase screen, as a function of the lateral position along the mirror 206, is represented by complex function F(x). The Fourier transform is then applied again, to transform the electric field amplitude distribution on the surface of the rotatable mirror 206, to the end face 208 of the output fiber 209. The complex function of the electric field amplitude distribution G(v) on the output fiber end face 208 is therefore as follows:

$$G(v)=G_0\int\exp[-x^2/A^2+k \cdot x \cdot (v-v_0)/f-2i \cdot k \cdot \alpha \cdot \Delta\lambda \cdot x]F(x)^2 dx, \quad \text{(equation 5)}$$

where $G_0$ is the normalization constant, v the lateral coordinate along the output fiber end face 208 (as defined in inset drawing 530), $v_0$ is the lateral position of the center of the core of output fiber 209, positioned in the front focal plane 532, and $A=(2f)/(k \cdot w_0)$, the radius of the collimated beam.

The electric field distribution inside a single-mode output fiber is also a Gaussian distribution, as in equation 3 above, except that the lateral coordinate u is replaced by v.

The coefficient of coupling C between G(v) and the output fiber 209 is as follows:

$$C=\int G(v) \cdot e(v)dv, \quad \text{(equation 6)}$$

and the full optical power transmittance through the output fiber 209 is simply:

$$T=|C|^2 \quad \text{(equation 7)}$$

For reference, if there is no phase mask, then F(x)=1 for all values of x, and therefore $T=\exp(-k^2 \cdot \alpha^2 \cdot \Delta\lambda^2 \cdot A^2)$. The more the incident wavelength deviates from the central wavelength $\lambda_c$, the less power is coupled to the output fiber 209. This is consistent with equation 1, above, and also explains the physics behind FIGS. 3A and 3B.

It is worth noting that to make the mathematical analysis more feasible, in the above equations it is assumed that the phase screen 505 is placed near or at the rear focal plane 533 of the lens 203.

The physics is essentially the same if the phase screen 505 is interposed in the collimated beam at other locations between lens 203 and the rotatable mirror 206. The phase screen 505 may even be placed between the two fiber ports 201 and 209 and the lens 203. However, this results in the equations and mathematical analysis becoming much more formidable. A phase screen 505 creates a phase shift across a beam and creates beam diffraction, regardless of where the phase screen is located. Similarly, phase screen locations that result in the beam passing through the phase screen a single time, two times, or more than two times, as the beam travels from the input fiber port to the output fiber port, are possible variations. Similarly, embodiments that result in the beam passing through the diffraction grating or other wavelength-dispersive element a single time, two times, or more than two times, as the beam travels from the input fiber port to the output fiber port, are possible variations.

The computational results for the following numerical examples, as shown in FIGS. 6D, 7B, 7D, 7E, 8C, 8D, 9A, and 9C, are all derived from equations 5, 6 and 7, above.

Figure 6A:
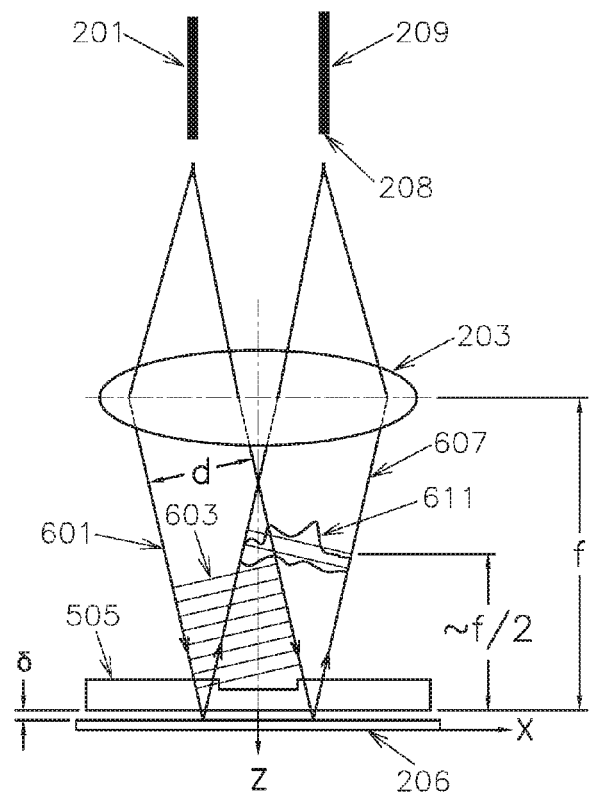
FIG. 6A illustrates a detailed view of an incident collimated Gaussian beam being passed through a phase screen and/or a transmission amplitude-modulated mask twice, after being reflected by the rotatable mirror of FIG. 5A.

In FIG. 6A a collimated Gaussian beam 601, with a beam diameter of d, passes through a phase screen 505, and is then incident on the rotatable mirror 206. (Note that in terms of equation 5, above, the radius A of the collimated beam is d/2.) The collimated beam is reflected by the rotatable mirror 206, and passes the phase screen 505 a second time. The diffraction grating (or other dispersive element) is not shown in FIG. 6A for simplicity, without losing the physical meaning. The incident angle to the rotatable mirror 206 is generally small, less than 10 degrees. The wave front 603 of the incident Gaussian beam 601 is flat. However, the reflected beam 607 exits the phase screen 505 with a highly irregular (distorted) wave front, indicated by 611, resulting from beam diffraction and beam phase shift in the lateral direction, due to the effects of the phase screen 505. A computational example of this wave front distortion is shown by curve 700 in FIG. 7A. The shape of wave front 611 continues evolving along the propagation direction, via the lens 203, until it hits the end face 208 of the output fiber 209.

Figure 6B:
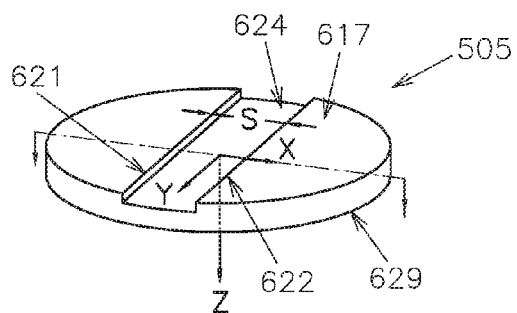
FIG. 6B shows a perspective view of a double-edge phase screen.

FIG. 6B shows a perspective view of one phase screen design 505, for the embodiment that is illustrated in FIG. 5A. A slot 624 of width s is recessed from the top surface 617. Therefore two edges 621 and 622 are created, which generate diffraction for the incident beam. The phase screen design 505 shown in FIG. 6B is called a double-edge phase screen.

Figure 6C:
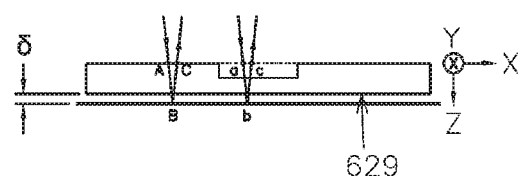
FIG. 6C shows a cross-section view of the double-edge phase screen.

FIG. 6C shows a cross-section view of the phase screen 505 of FIG. 6B, obtained by cutting the phase screen along, or parallel to, the x-axis of FIG. 6B. (Or, more precisely, at the plane defined by y=0.) The recess in the phase screen creates a phase difference between rays that pass through the phase screen in the slotted, recessed area, and rays that pass outside of the slot. For example, ray a-b-c passes through the slot area twice, whereas ray A-B-C passes outside the slot area twice. The depth of the slot is designed so that twice the recess depth is equal to, or near to, odd integer multiples of a half wavelength, for the tunable filter's intended range of wavelengths. Because the incident angle to the rotatable mirror 206 and the phase screen 505 is so small, points a and c are very close to each other, and so are points A and C. One skilled in the art will understand that instead of a slot 624, a protruding or raised platform on the central part of the surface 617 can also be used to create the required amount of phase shift or difference. In the case of a raised central area, the increased thickness of the central area of the phase screen, in comparison to the surrounding area, would be designed to be the same as the depth of the recess shown in FIG. 6B. Mathematically, the transmission function in equation 5 can be described by:

$$F(x)=1 \text{ if } |x|\leq s/2, \text{ or}$$

otherwise, $F(x)=\exp(i \cdot n \cdot \pi/2)$, where n is an odd integer (for a single pass of the phase screen).

Figure 6D:
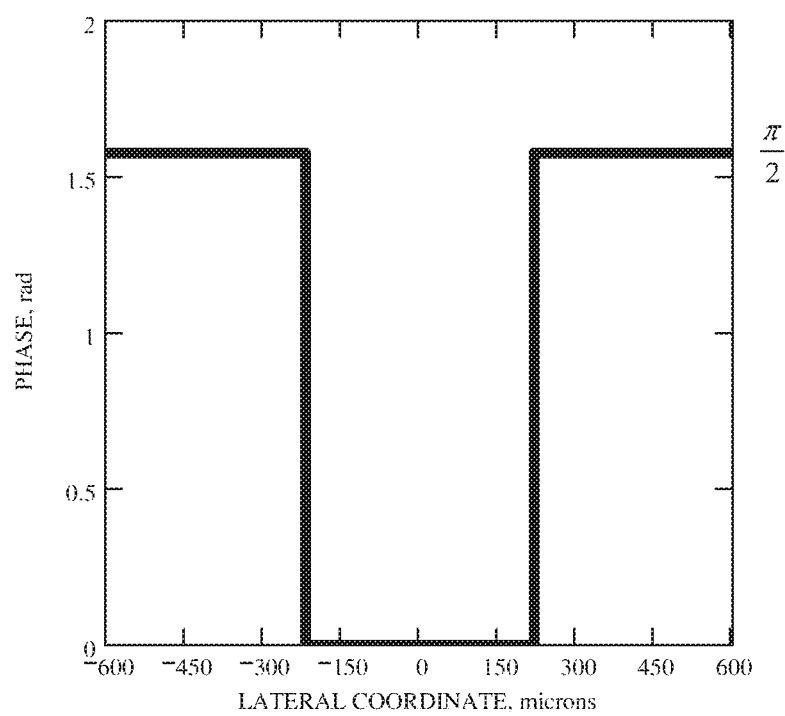
FIG. 6D shows an example of the phase difference provided by a double-edge phase screen, with dimensions that are matched to the typical beam size of the incident beam.

Note that the above equation represents a single pass of the beam through the phase screen. In the embodiments shown in FIGS. 5A and 6A, the beam is passing through the phase screen twice, and so the above equation is effectively applied twice. An example computation of the phase shift across the phase screen is shown in FIG. 6D, for a particular slot width s of 435 microns.

Figure 7A:
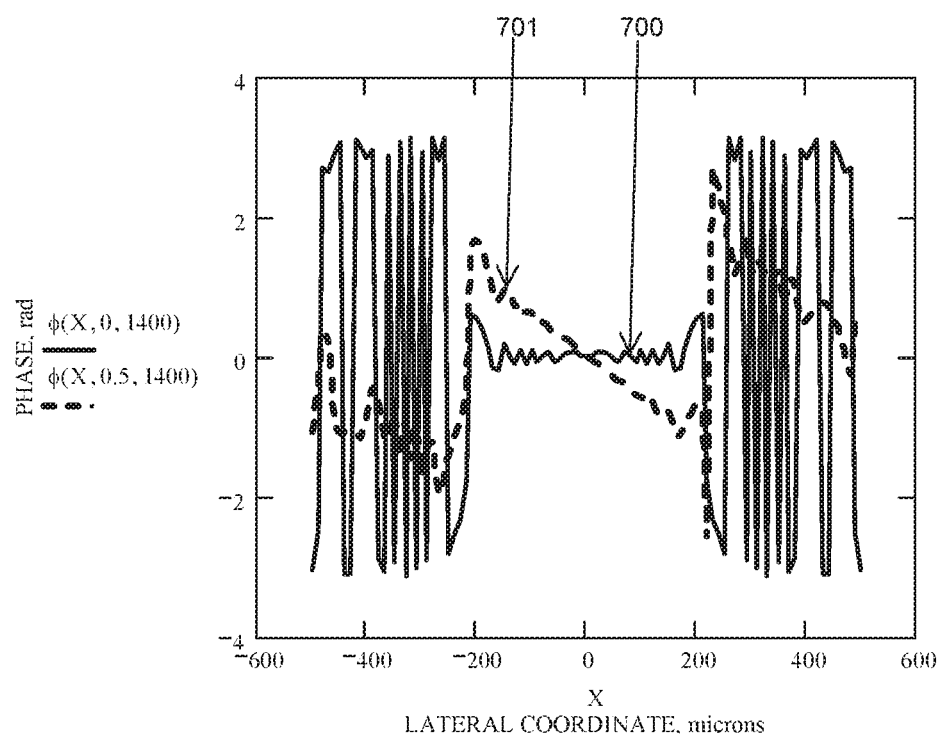
FIG. 7A shows exemplary phase distributions of two reflected beams incident upon the phase screen with two slightly deviated wavelengths, and corresponding incident angles.
Figure 7B:
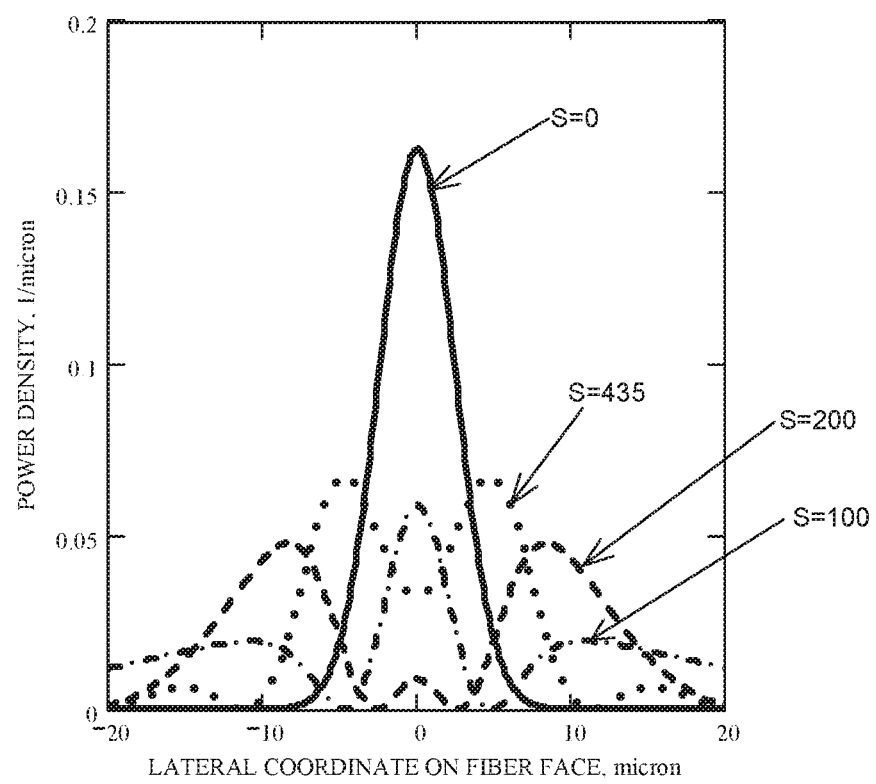
FIG. 7B shows optical power distributions over the end face of the output fiber for different slot widths of the double-edge phase screen.

FIG. 7B shows numerical computations of the optical power density at the end face 208 of the output fiber 209 in FIG. 6A, for various slot widths s, at 435 microns, 200 microns, 100 microns, and 0 microns. The computations assume a radius of A=282 microns for the collimated beam. At s=0, the power density is a Gaussian distribution. It reveals that the optical power is substantially spread out from the fiber core (which has a typical diameter of 9 microns) to the cladding when the width s of the slot in the phase screen is relatively large, and is comparable to the beam size.

Figure 7C:
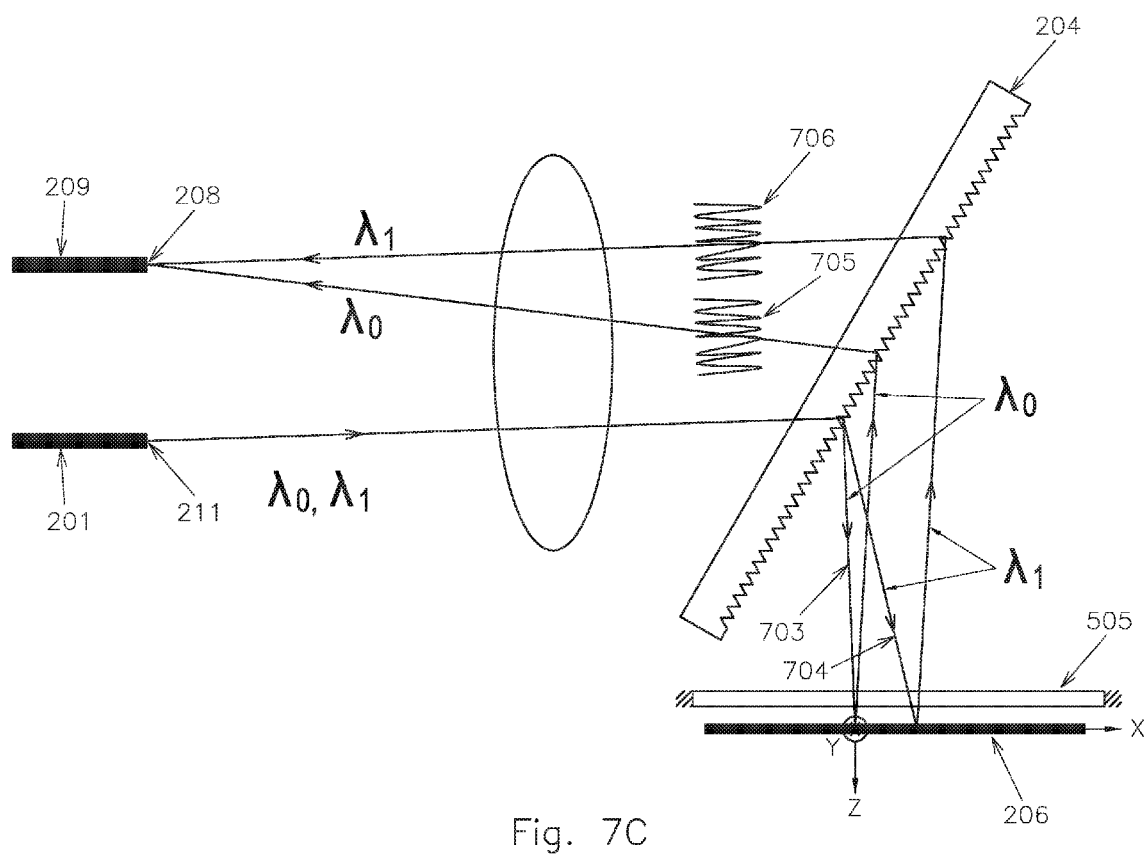
FIG. 7C illustrates an example of two slightly different wavelengths as they are angularly dispersed by the grating before entering a phase screen, or the combination of a phase screen and a transmission amplitude-modulated mask, and are then focused on the end face of the output fiber.

FIG. 7C shows how wavelengths that deviate slightly from the central wavelength ($\lambda_0$ in this discussion) are projected to the end face 208 of the output fiber 209. Suppose that the input fiber 201 carries two wavelengths, $\lambda_0$ and $\lambda_1$, which are dispersed by the diffraction grating 204 to two rays 703 and 704, respectively. Rays 703 and 704 lie in the X-Z plane, with two slightly different propagation directions. $\lambda_0$ is the central wavelength, 1550.0 nm for example, and is projected to the fiber core at the end face 208 of the output fiber 209, by rotating the rotatable mirror 206 to an appropriate angular position to achieve the optimal (maximal) power coupling to the output fiber 209. $\lambda_1$ is a wavelength that is slightly deviated from $\lambda_0$. The wavefronts for the two rays $\lambda_0$ and $\lambda_1$ are indicated by 705 and 706 respectively. Example numerical computations of the phase distributions for rays $\lambda_0$ and $\lambda_1$ are shown in FIG. 7A, as curve 700 and curve 701, respectively. The shapes of these two wave fronts appear quite different.

Figure 7D:
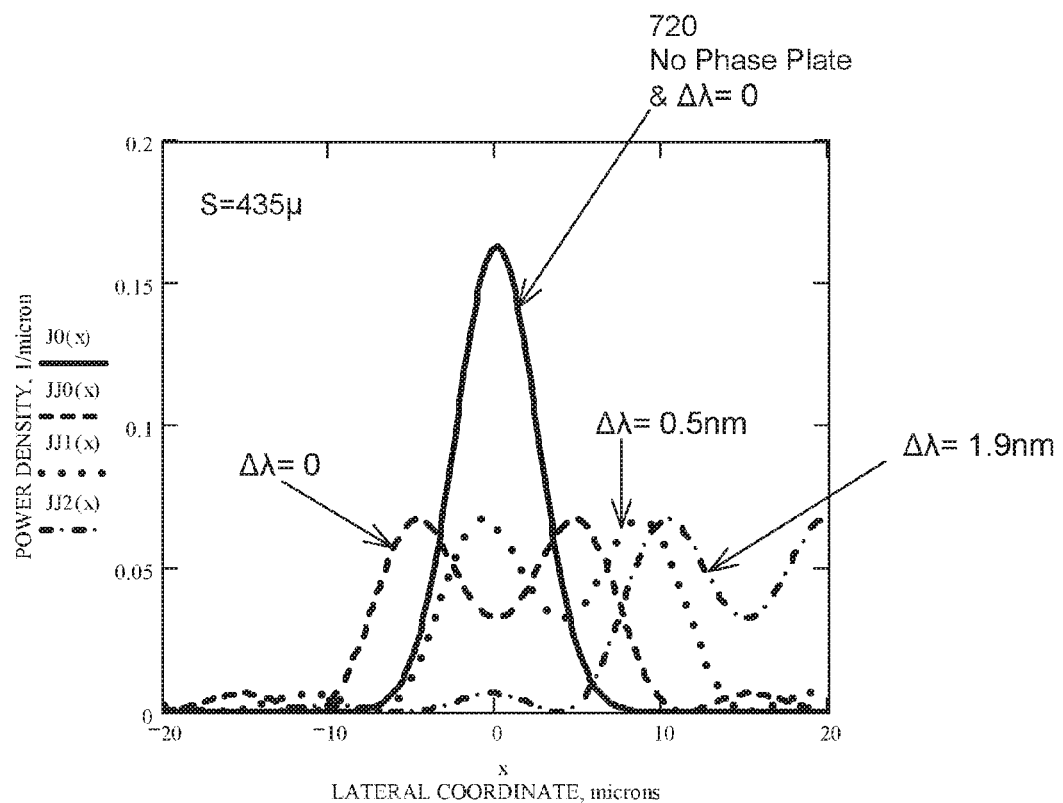
FIG. 7D shows the optical power density profiles over the end face of the output fiber, for a few beams with different wavelengths, using a slot width of 435 microns for the double-edge phase screen.

FIG. 7D shows example numerical computations of the optical power density over the output fiber end face 208, for three slightly different wavelengths, when the slot width s of the phase screen is 435 microns. Curve 720 is provided as a reference, and shows the optical power density of the central wavelength with no phase screen, and shows the expected Gaussian distribution. The other three curves show the effect of the phase screen on the central wavelength ($\Delta\lambda=0$), a slightly-deviated wavelength ($\Delta\lambda=0.5$ nm), and a wavelength with more deviation ($\Delta\lambda=1.9$ nm), respectively. As can be seen in the curves, the light spot of the 1.9 nm deviated wavelength is significantly moved away from the fiber core.

Figure 7E:
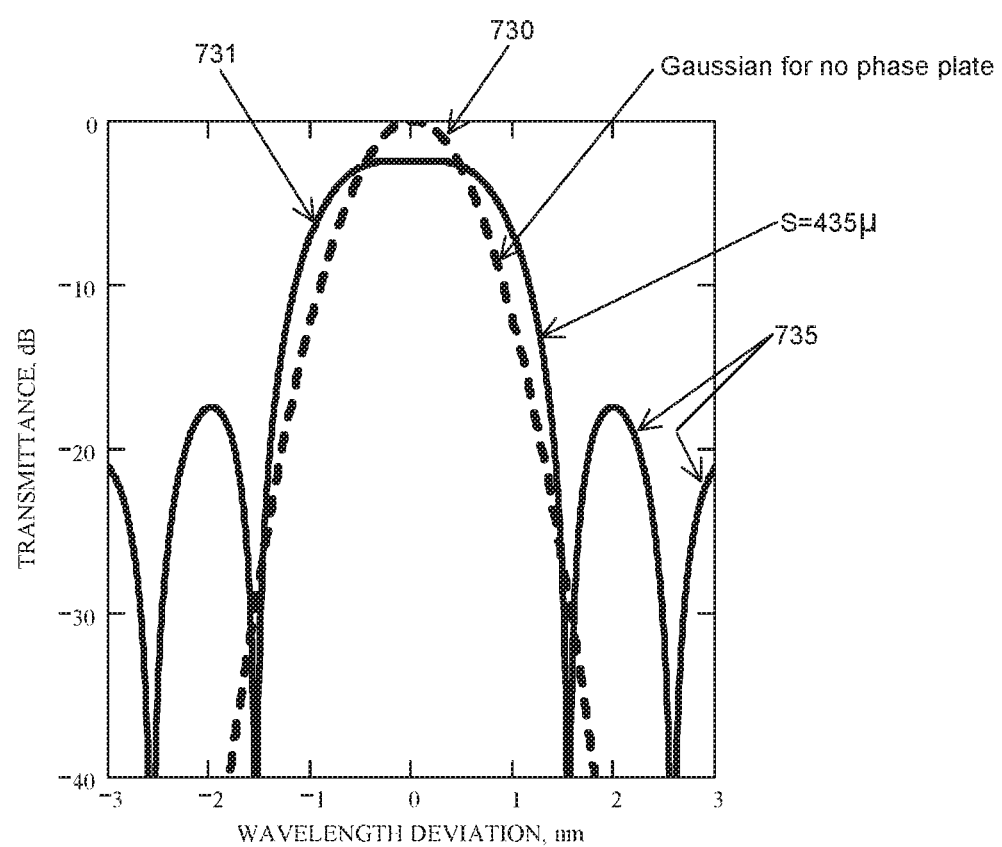
FIG. 7E shows two output spectra of a continuous spectrum, as coupled to the output fiber by a tunable filter with a phase screen, as shown in FIG. 5A, and a tunable filter without a phase screen, as shown in FIG. 2A.

FIG. 7E shows the wavelength spectrum that emerges from the output fiber 209, when a flat spectrum (as shown in FIG. 3A) is applied to the input fiber 201, for the embodiment shown in FIG. 5A. By performing the computation of equation 7, and assuming that the phase screen 505 has a slot width s of 435 microns (as shown in FIGS. 6A, 6B, and 6C), the wavelength spectrum out of the output fiber 209 is numerically represented by curve 731. Curve 730 is included for reference, and shows the case in which there is no phase screen, resulting in the expected Gaussian distribution. As seen in FIG. 7E, the top of the spectrum curve 731 is significantly flatter than that of curve 730. However, side bands are adversely created, as indicated by 735. These side bands are a result of the interference between waves that are diffracted by the two edges 621 and 622 of the slot in the phase screen, as shown in FIG. 6B.

Figure 7F:
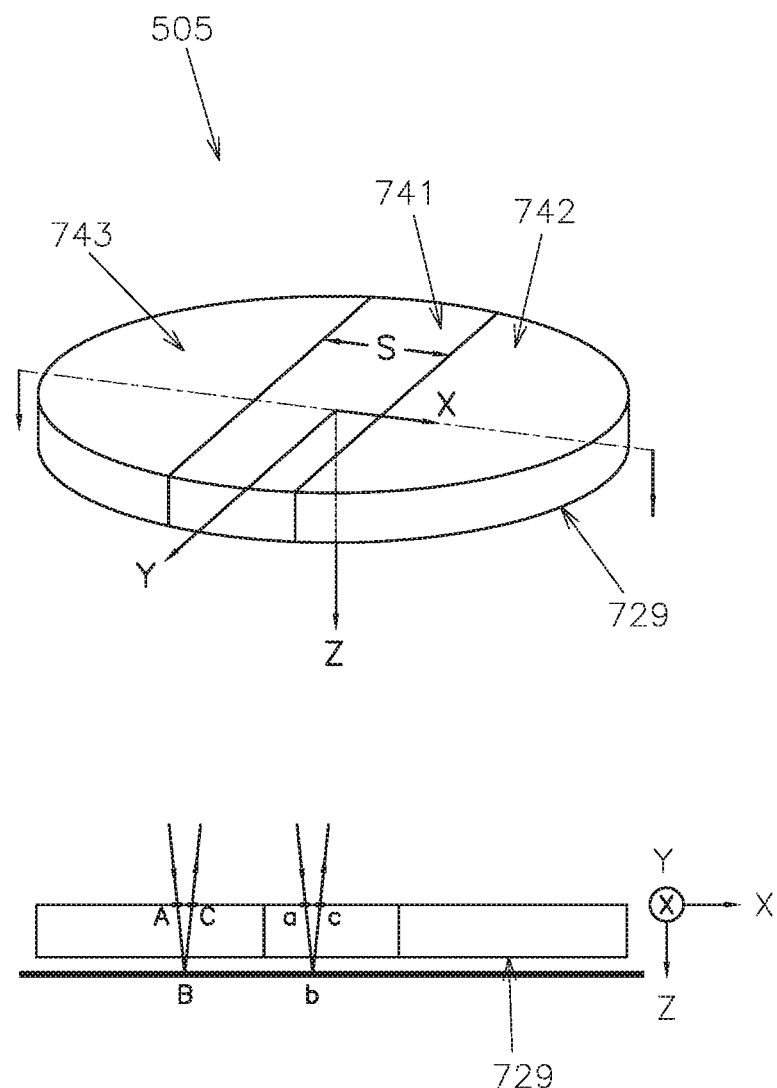
FIG. 7F illustrates yet another phase screen design, which implements a step change in the index of refraction of the phase screen material, across one dimension of the phase screen.

FIG. 7F shows another embodiment, comprising another phase screen design that can be used to flatten the top of the passband. As shown in the perspective view indicated by 505, the strip 741, having refraction index $n_1$, is seamlessly sandwiched between two pieces 742 and 743 having refraction index $n_2$. The two pieces 742 and 743 may have a physical thickness that is equal to or unequal to that of the strip 741. Refraction index $n_1$ can either lower or higher than $n_2$, as long as the phase difference between the two optical paths A-B-C and a-b-c, as indicated in the cross-section view indicated by 760, is equal to, or nearly equal to, an odd integer multiple of one half of the wavelength. Thus the phase screen design shown in FIG. 7F also serves the purpose of flattening the top of the passband relative to the Gaussian shape without a phase screen.

The two phase screen designs detailed in FIGS. 6B and 6C and FIG. 7F have been presented for purposes of illustration and description. It is not intended to be exhaustive or to limit the embodiments to the precise form disclosed. Many modifications and variations are possible in light of the above teaching, as long as the phase screen can create a phase shift or phase difference across the incident beam, and create beam diffraction. The detailed embodiments shown in the figures were chosen in order to explain the principles involved and their practical applications.

Figure 8A:
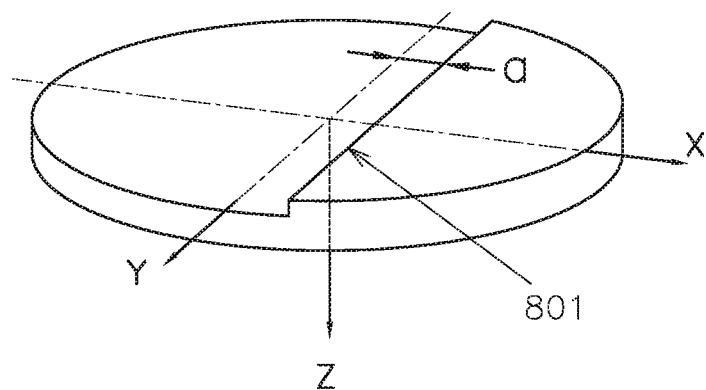
FIG. 8A illustrates a perspective view of another phase screen design with only one edge.
Figure 8B:
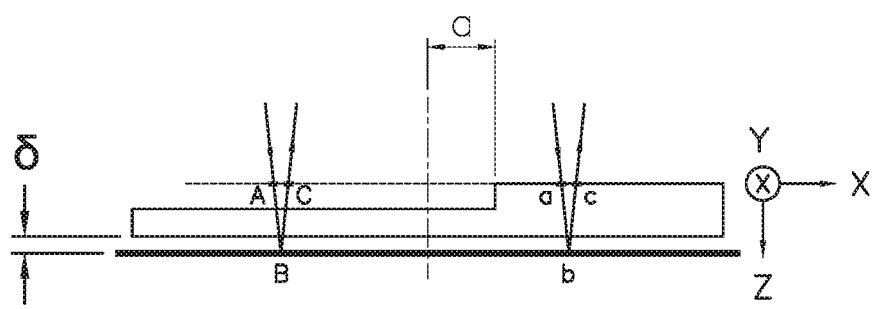
FIG. 8B is a cross-section view of phase screen shown in FIG. 8A.
Figure 8C:
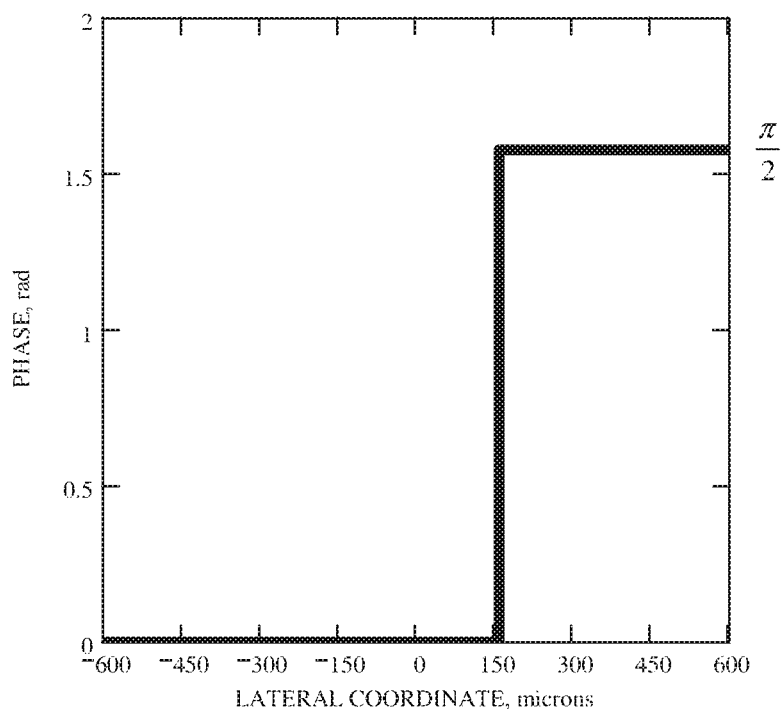
FIG. 8C shows an example of the phase difference provided by a single-edge phase screen, with dimensions that are matched to the typical beam size of the incident beam.

The side bands shown in FIG. 7E can be eliminated by a different phase screen design, representing another embodiment. Instead of a double-edge phase screen, as shown in FIG. 6B, FIGS. 8A and 8B show a single-edge phase screen design. The single edge 801 is separate from the central axis Y by a distance a. As shown in cross section view 8B, the two rays that pass through the thick and thin sides, as indicated by a-b-c and A-B-C, respectively, have a phase difference that is an odd integer multiple of one half wavelength. FIG. 8C provides an example of the phase difference as a function of lateral position, for a single-edge phase screen where a is 150 microns.

Figure 8D:
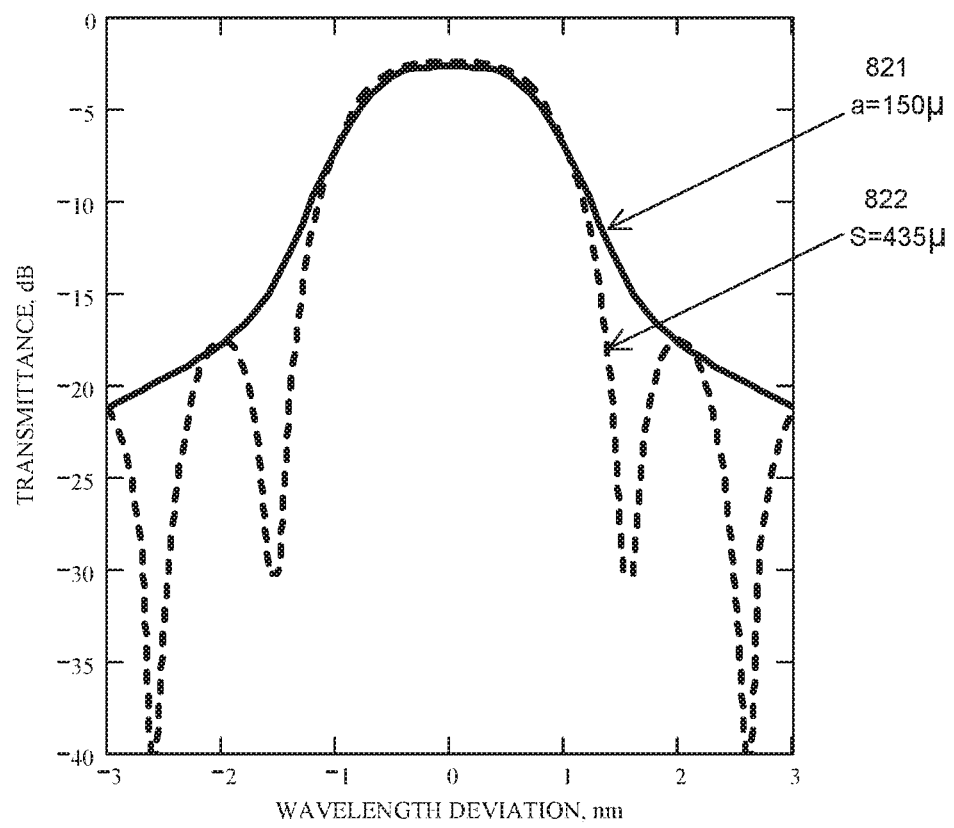
FIG. 8D shows two output spectra of a tunable filter, implemented with a single-edge phase screen and with a double-edge phase screen, respectively.

FIG. 8D shows a comparison of the passband spectra of a tunable filter, with curve 821 showing the use of a single-edge phase screen with a=150 microns, and curve 822 showing the use of a double-edge phase screen with slot width s=435 microns. The side bands are removed via use of a single-edge phase screen, but the attenuation away from the central wavelength is not improved. As such, the spectrum of curve 821 may not provide sufficient attenuation or isolation of adjacent channels.

The double-edge phase screen shown in FIGS. 6B and 6C may also be rotated by some angle around the Z-axis, as shown in FIG. 6B. If the phase screen is rotated around the Z-axis by 30 degrees, for example, the two edges of the phase screen will no longer be perpendicular to the direction of the beam's dispersion (which was originally along the X-axis). This rotation of the phase screen changes the effective slot width of the phase screen, s, and also serves to suppress side bands or lobes in the resulting passband characteristic. Other embodiments may use multiple slots, whether recessed, raised, or of a differing index of refraction. Additionally, the properties and/or dimensions of the slot can be varied, such as in width or depth, along the Y-axis as represented in FIGS. 6B, 6C, and 7F, so that the effect of the phase screen can be varied by shifting the position of the phase screen along the Y-axis. In still other embodiments, the double-edged phase screen of FIGS. 6B and 6C can be replaced by a phase screen that has a circular recessed area or raised platform at its center, with radius a. This phase screen configuration also results in suppressed side bands or lobes. In all of these cases, the phase screen alters the incident electrical field distribution of the incident beam of light, allowing for the output to be shaped by flattening the distribution as illustrated in FIG. 7E, or otherwise shaping the distribution to deviate from its otherwise Gaussian shape.

Figure 9A:
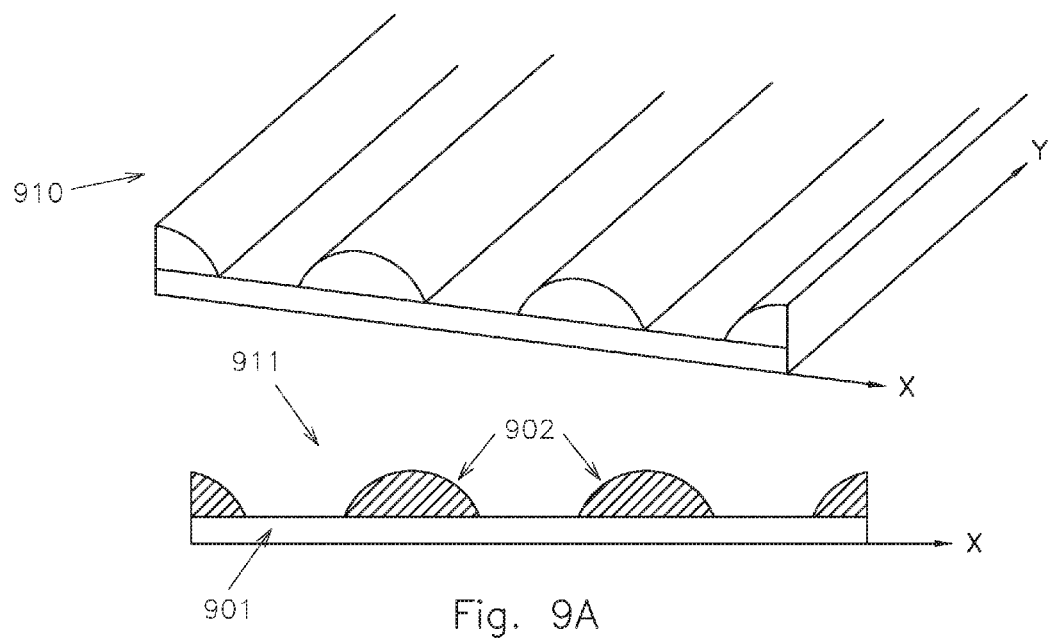
FIG. 9A illustrates another design that modulates the transmission amplitude in combination with a double-edge phase screen, in order to suppress the side bands of the output spectrum.
Figure 9B:
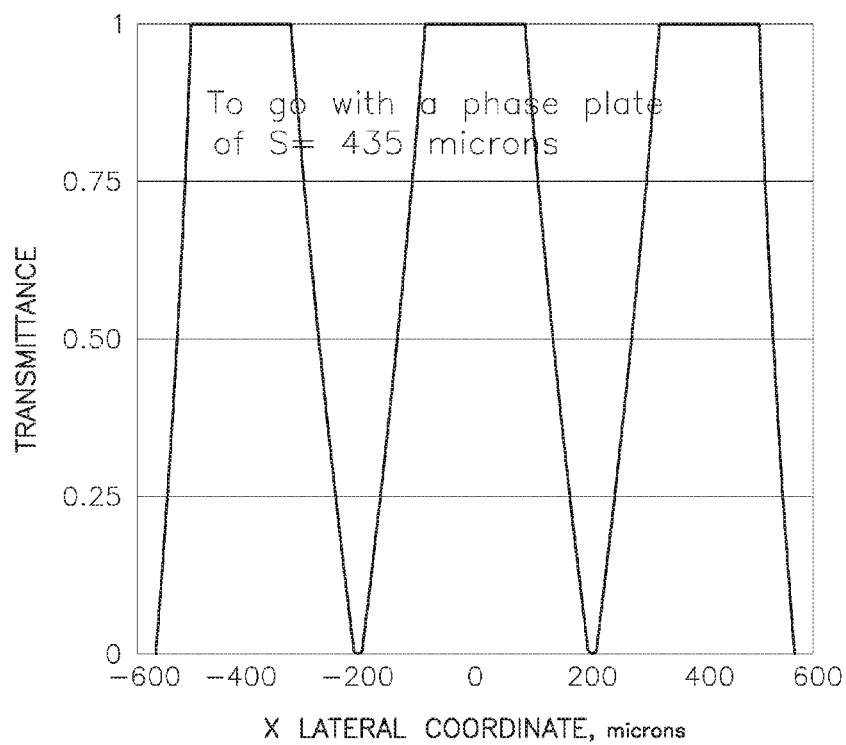
FIG. 9B gives an exemplary set of dimensions for the transmission amplitude-modulated mask shown in FIG. 9A.

FIG. 9A shows one design of a transmission amplitude-modulated mask that can be added in the optical path, here located adjacent to the phase screen 505, to create other embodiments that are intended to suppress the unwanted side bands. Drawing 910 provides a perspective view of the transmission amplitude-modulated mask, and drawing 911 shows its cross-section view, cutting along, or in parallel to, the X-axis. An absorptive material 902, such as photo-resist, or dyed polymers, is deposited with varying thickness on a thin transparent substrate 901, to modulate the beam transmittance, which is shown as a numerical example in FIG. 9B. The absorptive material 902 is patterned or positioned in appropriate locations in order to absorb optical power that is contributing to the side bands, but without significant effect on the center of the passband.

Figure 9C:
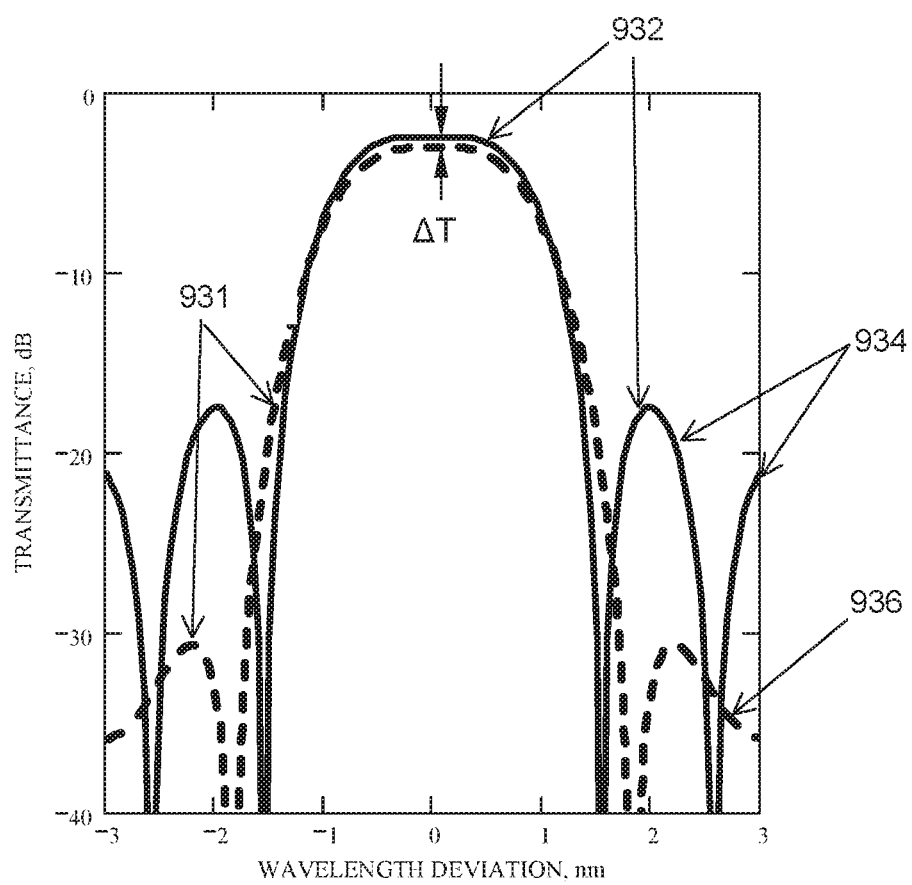
FIG. 9C shows two output spectra of a tunable optical filter having a double-edge phase screen, either with or without the transmission amplitude-modulated mask, respectively.

FIG. 9C shows an example numerical computation of the bandpass spectrum of a tunable filter equipped with a phase screen plus a transmission amplitude-modulated mask, shown as curve 931. Curve 932 is included for comparison, and shows the bandpass spectrum without the addition of the transmission amplitude-modulated mask. As seen in the figure, the side band 934 of curve 932 is suppressed significantly, resulting in the weak side band 936 of curve 931. The addition of the transmission amplitude-modulated mask also causes a slight amount of attenuation at the center of the passband, but the intensity difference ΔT between curve 932 and curve 931 at the central wavelength is small enough to not be a significant concern. Alternatively, the absorptive pattern 902 can be coated directly onto the back side 629 of the phase screen 505 that is shown in FIG. 6B, or it can be coated directly onto either side of the phase screen 505 shown in FIG. 7F.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles involved and their practical application, to thereby enable others skilled in the art to best utilize the various embodiments and with various modifications as are suited to the particular use contemplated. It is intended that the scope of the invention be defined by the claims appended hereto.

The invention claimed is:

1. A tunable optical filter device, comprising:
   one or more diffraction elements oriented to differentially diffract light of different wavelengths of a beam of light incident thereupon from an input port;
   a reflector that reflects portions of the beam of light incident thereupon by at least one of the one or more diffraction elements in an optical path between the input port and an output port;
   an actuator connected to change a position of the reflector so that a selected range of wavelengths of the portion of the beam of light incident upon the reflector is reflected along the optical path from the input port to the output port; and
   a phase screen in the optical path from the input port to the output port that alters an electrical field distribution of the portion of the beam of light incident thereupon.

2. The tunable optical filter device of claim 1, wherein the phase screen is between a first of the diffraction elements and the reflector in the optical path from the input port to the output port.

3. The tunable optical filter device of claim 2, wherein the reflector reflects the portions of the beam of light incident thereupon by the first of the diffraction elements to traverse the phase screen a second time and to be diffracted a second time by the first of the diffraction elements in the optical path between the input port and the output port.

4. The tunable optical filter device of claim 1, wherein the actuator changes the position of the reflector by rotating the reflector about one or more axes.

5. The tunable optical filter device of claim 4, wherein the phase screen includes one or more edges whereby the electrical field distribution is altered that are oriented to be parallel to a first rotational axis of the reflector.

6. The tunable optical filter device of claim 4, wherein the phase screen includes one or more edges whereby the electrical field distribution is altered that are oriented at a non-zero degree angle relative to a first rotational axis of the reflector.

7. The tunable optical filter device of claim 1, wherein the one or more diffraction elements include a diffraction grating.

8. The tunable optical filter device of claim 1, further comprising:
   a lens located between the one or more diffraction elements and the input port, whereby the beam of light incident on the one or more diffraction elements from the input port is collimated.

9. The tunable optical filter device of claim 1, further comprising:
   a ferrule including the input port and the output port.

10. The tunable optical filter device of claim 1, wherein the phase screen is a double-edge phase screen.

11. The tunable optical filter device of claim 1, wherein the phase screen is a single-edge phase screen.

12. The tunable optical filter device of claim 1, wherein the phase screen includes a strip of a first material having a first index of refraction sandwiched between two regions of a second material having a second index of refraction differing from the first index of refraction.

13. The tunable optical filter device of claim 1, wherein the phase screen includes a circular region of a first material having a first index of refraction radially surrounded by a second material having a second index of refraction differing from the first index of refraction.

14. The tunable optical filter device of claim 1, further comprising
   a transmission amplitude-modulated mask adjacent to the phase screen in the optical path from the input port to the output port.

15. The tunable optical filter device of claim 1, wherein the phase screen includes a transmission amplitude-modulation coating on a surface thereof.

16. The tunable optical filter device of claim 1, where the phase screen alters the electrical field distribution of the portion of the beam of light that is incident thereupon, such that a spectral distribution at the output port deviates from a Gaussian spectral distribution.

17. The tunable optical filter device of claim 1, where the phase screen is deposited onto the reflector as a coating.

18. A method, comprising:
   receiving a beam of light at an input port;
   directing the beam of light to be incident on one or more diffraction elements;
   differentially diffracting by the one or more diffraction elements, of light of different wavelengths of the beam of light incident thereon from the input port;
   positioning a reflector so that a first selected range of wavelengths of a portion of the beam of light incident upon the reflector from at least one of the one or more diffraction elements is reflected along an optical path from the input port to an output port; and
   altering an electrical field distribution of the portion of the beam of light that is incident on a phase screen positioned in the optical path from the input port to the output port.

19. The method of claim 18, wherein the phase screen is between a first of the diffraction elements and the reflector in the optical path from the input port to the output port.

20. The method of claim 19, wherein the reflector reflects the portions of the beam of light incident thereupon by the first of the diffraction elements to traverse the phase screen a second time and to be diffracted a second time by the first of the diffraction elements in the optical path between the input port and the output port.

21. The method of claim 18, wherein the reflector is positioned by rotating the reflector about one or more axes by an actuator.

22. The method of claim 21, wherein the phase screen includes one or more edges whereby the electrical field distribution is altered that are oriented to be parallel to a first rotational axis of the reflector.

23. The method of claim 21, wherein the phase screen includes one or more edges whereby the electrical field distribution is altered that are oriented at a non-zero degree angle relative to a first rotational axis of the reflector.

24. The method of claim 18, wherein the one or more diffraction elements include a diffraction grating.

25. The method of claim 18, further comprising:
collimating the beam of light incident on the one or more diffraction elements from the input port by a lens located between the one or more diffraction elements and the input port.

26. The method of claim 18, wherein the input port and the output port are included in a ferrule.

27. The method of claim 18, wherein the phase screen is a double-edge phase screen.

28. The method of claim 18, wherein the phase screen is a single-edge phase screen.

29. The method of claim 18, wherein the phase screen includes a strip of a first material having a first index of refraction sandwiched between two regions of a second material having a second index of refraction differing from the first index of refraction.

30. The method of claim 18, wherein the phase screen includes a circular region of a first material having a first index of refraction radially surrounded by a second material having a second index of refraction differing from the first index of refraction.

31. The method of claim 18, further comprising
modulating the amplitude of the portion of the beam of light that is incident on a transmission amplitude-modulated mask adjacent to the phase screen in the optical path from the input port to the output port.

32. The method of claim 18, further comprising
modulating an amplitude of the portion of the beam of light that is incident on the phase screen by a transmission amplitude-modulation coating on a surface thereof.

33. The method of claim 18, where the phase screen alters the electrical field distribution of the portion of the beam of light that is incident thereupon, such that a spectral distribution at the output port deviates from a Gaussian spectral distribution.

34. The method of claim 18, where the phase screen is deposited onto the reflector as a coating.

* * * * *